Aug. 18, 1964  R. R. CARLTON  3,144,891

SAW CHAIN SEMICHISEL BIT CUTTER

Filed May 15, 1961

INVENTOR.
Raymond R. Carlton
BY
Buckhorn, Cheatham & Blore
ATTORNEYS

United States Patent Office 3,144,891
Patented Aug. 18, 1964

3,144,891
SAW CHAIN SEMICHISEL BIT CUTTER
Raymond R. Carlton, Portland, Oreg., assignor to Omark Industries, Inc., Portland, Oreg., a corporation of Oregon
Filed May 15, 1961, Ser. No. 110,193
3 Claims. (Cl. 143—135)

This invention relates to saw chains, and more particularly to a novel semichisel bit cutter link for saw chains.

There are two types of general L-shaped or hook shaped saw chain cutters in common use today, one being a curved tooth or chipper tooth cutter having a curved corner portion of relatively large external radius between the shank and the toe of the cutter and the other being a chisel tooth cutter having a sharp outer corner between the shank and toe. Saw chains having chisel teeth have a smoother and more rapid cutting action in wood than the curved tooth chains, but the curved tooth is more popular with woodsmen because it can be filed more easily, by using a round file held in one position.

It is the principal object of the invention to combine into one novel tooth configuration the desirable smooth and rapid cutting characteristics of the chisel tooth with the ability to be resharpened with a round cylindrical file characteristic of the curved tooth.

Another object is to provide at the same time a cutter tooth having increased strength at the juncture of the toe and shank to resist the severe stresses at that point due to its having that portion of the cutting edge which encounters the greatest resistance during cutting.

A further object is to provide a cutting tooth constructed in such a manner as to allow the cutter tooth when filed with a round file in a normal fashion to produce a cutting edge that contains a designed in hook which allows the leading edge of the cutter to enter the wood before the side plate severs the cross grain, thus allowing the cutter to be forced into the wood by the unsevered cross grain to create more efficient cutting with less pressure.

More specifically, the above objects of the invention may be carried out by providing a cutter tooth having a generally L-shaped configuration but being provided with a small radius curved portion of increased thickness at the vertex of the L, which tooth may be cold formed inexpensively by an upsetting operation.

Further objects of my invention will become apparent upon a reading of the detailed description which follows with reference to the drawing in which.

Figure 1:
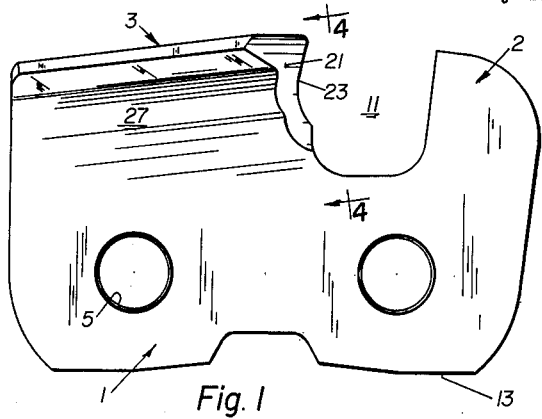
FIG. 1 is a side elevational view of a cutter link embodying my invention.

In accordance with my invention a cutter link as shown generally in FIG. 1 may have a flat metal body plate 1, an integral blunt depth gauge 2 projecting from its forward end, and an integral hook-shaped cutter tooth 3 extending upward along a major portion of the top of the plate. The cutter tooth is shown on a side link of a saw chain, and each such cutter link in a given chain is identical except for being of alternate right and left-hand configuration. The links are arranged in the saw chain as shown generally in the patent to Cox, No. 2,508,784, issued May 23, 1950, the cutter links being spaced from one another by spacer links, and all the side links, both cutter and spacer, being pivotally connected to center links by means of pivot pins through holes 5 in the plates.

Figure 2:
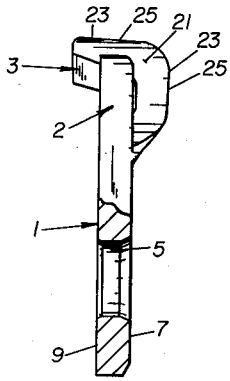
FIG. 2 is a front end elevation of the cutter link of FIG. 1 with a portion broken away.

Referring to FIG. 2, the end of the pivot pin hole 5 adjacent the outer face 7 of the body plate is countersunk to a depth of approximately one third of the stock thickness. It is also desirable to provide a slight chamfer at the hole end adjacent the inner face 9, which is adjacent the connecting center link. The arcuate recess 11 provided between the rear portion of the depth gauge and the cutter tooth should be large enough to permit a sharpening file to move freely between the depth gauge and the front edge of the cutter tooth, as indicated in dotted lines in FIG. 3. The saw bar engaging bottom edge 13 of the plate may have any suitable shape such as one in which such edge has an upward slant beginning at the centerline of the hole 5 extended to its inner edge.

Figure 4:
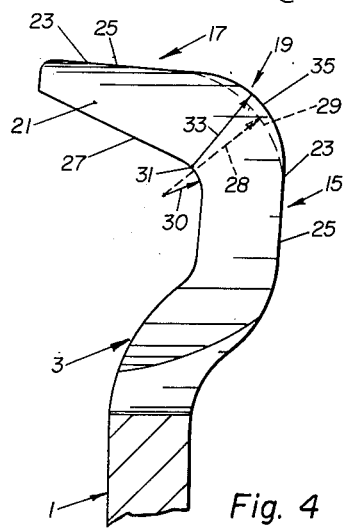
FIG. 4 is an enlarged fragmentary view of the cutter tooth of FIGS. 1 to 3 taken along lines 4—4 of FIG. 1.

So far as described above, the cutter link is of conventional type. The cutter tooth itself, however, differs from either of the cutter teeth above described. Referring to FIG. 4, the hook-shaped cutter tooth 3 comprises a flattened shank portion 15 and a flattened toe portion 17 joined by a small radius curved portion 19 of greater thickness than both the shank and the toe. The forward edge of the cutter tooth has a beveled surface 21 which is sharpened to form a continuous chisel cutting edge 23 at its intersection with the outer surface 25 of the tooth. The flattened shank portion 15 preferably is offset laterally from the plate and is bent outwardly and upwardly from the plate so that a major portion of the shank makes a small angle with the vertical when the plate 1 is vertical so that the cutting edge along the shank will be substantially perpendicular to the wood grain as it cuts to form the sidewall of the kerf. The flattened toe 17 extends transversely inwardly toward the body plate at about a right angle thereto and is tangential to the curved portion 19 along both the inner surface 27 and the outer surface 25 of the tooth. The toe is preferably tapered toward its outer or free end by having its inner surface inclined upwardly at a greater angle than the outer surface. Also the cutting edge along the toe slants rearwardly toward the free end, preferably at an angle of from 30 to 35 degrees. This tapered toe reduces drag at the outer extremity of the toe and helps the chip sliced by the toe cutting edge clear the toe with a minimum of resistance.

Figure 3:
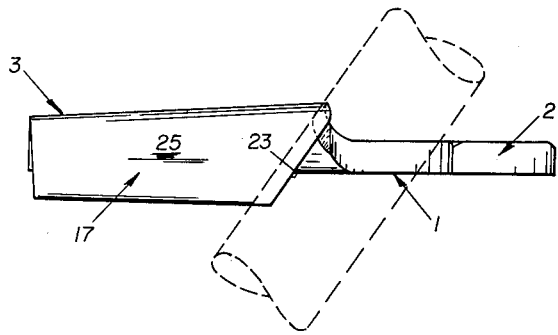
FIG. 3 is a top plan view of the cutter link of FIGS. 1 and 2.

It will be noted from FIG. 3 that the shank is tapered inwardly toward the rear end of the plate, a suitable angle with respect to the plate being about 3 degrees. As shown in FIG. 1, the toe portion is also tapered downwardly toward the rear end of the shank, a suitable angle being about 7 degrees. Likewise, the shank is inclined slightly outwardly with respect to the plate. These are all clearance angles which will permit, for the most part, only the cutting edge of the tooth to contact the kerf sidewalls and bottom, thus reducing to a minimum unnecessary drag. Although the toe is inclined upwardly slightly from the horizontal in a lateral direction at about a 5 degree angle when the plate 1 is vertical, the downward taper of the toe in a rearward direction and the rearward slant of its cutting edge results in the cutting edge of the toe actually being horizontal, thus enabling it to slice through the wood parallel to the grain to form the bottom of the kerf.

It will be noted that the tooth described thus far is somewhat similar to a chisel cutter because of the flat tapered toe with horizontal cutting edge and flat shank with a vertical cutting edge when the plate or body portion 1 is vertical. However, the small radius curved portion 19 joining the toe and shank replaces the sharp corner characteristic of a chisel tooth chain. The curved portion is thicker than either the toe or the shank, which portions usually have a maximum thickness equal to the thickness of the stock from which the cutter blank is formed. The increased thickness increases the strength of the tooth over that of a conventional curved tooth chain at this critical juncture of toe and shank. That is especially important since the curved portion encounters the greatest resistance to cutting because the cutting edge along the curve leads the cutter tooth through the wood and forms the bottom corner of the kerf. Furthermore, it is the portion of the cutting edge which cuts across the fiber of the wood.

The increased thickness in the curved portion is made possible by providing a smaller radius curve or sharper curve along the outer surface 25 of the tooth than is possible in a conventional curved tooth chain while having a radius of curve along the inner surface 27 of the tooth substantially equal to that of a conventional curved tooth chain. The sharpness of the curve in a conventional curved tooth is limited since the curved tooth is formed using a simple bending operation, while the tooth of the present invention must be formed by either a casting or, preferably, an upsetting operation. To form by bending, a small radius curve in the portion of the tooth joining the toe and shank will cause a thinning of the metal in the bend since the metal there must stretch along the outer surface 25 which, of course, will cause a structural weakness in this area. Also, a small radius bend at this point will cause a compression or pinching of the metal along the inner surface 27 of the curved portion, which will reduce the thickness of the cross section even further. In the past, structural weakness in this portion has been a frequent cause of tooth breakage.

The present invention provides a thickened curved portion by producing a substantially sharper outside curve on the curved portion of the tooth than could heretofore be provided by bending, but which is not so sharp as to prevent resharpening with a round file. In forming a curved tooth by bending, the resulting radius 28 of the outside curve 29 thus produced and represented by the dashed line in FIG. 4 will usually be somewhat greater than the sum of the radius 30 of the inside curve 31 plus the thickness of the stock which, as previously mentioned, is the same as the thickness of the plate 1 and the shank 15.

As an example, in a cutter link having a stock thickness of .058 inch and an inside radius of .031 inch, the outside radius of the curved portion of the cutter tooth will be approximately .089 inch. In actual practice, the outside radius of curvature formed by bending will be slightly greater than the above sum because of the previously mentioned thinning of the cross section in the bent portion. However, for comparison, in the cutter tooth of the present invention of the same nominal size, the radius 33 of the actual outside curve 35 will be considerably less than the above sum, preferably about .062 inch, but the inside radius 30 can be the same as that of the curved tooth, that is, .031 inch. Since the outer surfaces of the toe and shank are tangent to the outside curve 35 and the inside surfaces of the toe and shank are tangent to the inside curve 31, the thickness in the curved portion will be greater than the .058 inch thickness of the shank and body plate. Another way to express the thickened curve portion of the cutter tooth is to say that the outside radius 33 has a center of curvature located nearer the center of the material of the cutter tooth than the center of curvature for the inner radius 30 of the curved portion.

The smaller outside radius and therefore sharper curve causes the configuration of the cutter tooth of the present invention to approximate a right angle bend and thus approximate the cutting action of a chisel cutter tooth, yet because the tooth has a small radius curve rather than a right angle bend the cutter tooth may be resharpened using a round cylindrical file.

The thickened curved portion of the cutter tooth is preferably cold formed using an upsetting operation such as the method disclosed in patent application Serial No. 110,192 filed May 15, 1961 by Neumeier, Johnson and Krause, which forms the cutter tooth in essentially a two-step operation by first bending the cutter portion of a flat metal blank having a stock thickness equal to the thickness of the body plate approximately half way to its final shape and then upsetting the toe and curved portion so that the tooth takes its final shape except for grinding.

The forward beveled surface 21 of the toe portion is ground concave in the direction of cutting to provide a substantially straight cutting edge between such surface and the outer surface 25 of the cutter. This hollow-ground effect is desirable since such cutting edge on the toe slices through the wood parallel to the grain. On the other hand, the bevel in the curved and shank portions is ground flat in the direction of cutting which is also desirable since this portion of the tooth cuts across the grain and there is greater resistance to removal of the cut material. The surfaces described conform to the surface of a circular cylinder, enabling the cutting edge to be resharpened by using a round cylindrical file of corresponding size.

As seen most clearly in FIG. 1, the cutting edge on the shank portion of the tooth is preferably formed with a slight hook or negative angle to the vertical when the cutter link is in the position shown which makes the cutting edge in the curved portion of the tooth the leading edge as it cuts through the wood to form the bottom corner of the kerf. This negative angle to the vertical is preferably of the order of 7 to 15 degrees, measured from the curved portion of the cutting edge at the point of tangency between the outer curve 35 on the cutter and the shank thereof. This hook results when the cutter is sharpened with a round file in a normal manner and allows the leading edge of the cutter to enter the wood before the side plate severs the cross grain, then allowing the cutter to be forced into the wood by the unsevered cross grain to create more efficient cutting with less pressure.

Figure 5:
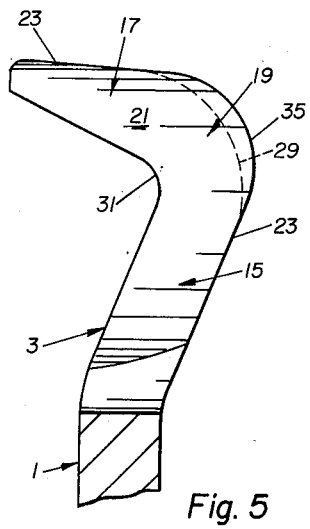
FIG. 5 in an enlarged fragmentary view showing a modification of the cutter tooth of my invention.

In FIG. 5 a modification of the cutter link of the invention has been shown which has the same cutter tooth configuration of the toe and curved portion but has a slightly modified shank, whereby the shank is not offset from the body portion but merely inclined upwardly and outwardly therefrom, so that the cutting edge along the shank is not as close to the vertical as in the preferred embodiment. However, since the cutting edge along the flattened portion of the shank does very little, if any, cutting the operational characteristics of the tooth of FIG. 5 are very similar to those of the tooth of FIG. 4 although the tooth of FIG. 4 provides a somewhat smoother cutting action.

While the cutter tooth of the present invention has been described as being positioned on a side link of a saw chain having an integral depth gauge, and such construction is preferred it is to be understood that this same cutter tooth configuration can be applied to a center link, or to a link having no integral depth gauge. It is also to be understood that while the invention has been described with respect to only one cutter link, each cutter link in a given saw chain will be identical with the one described except for being of alternate left and right-hand configuration.

In the foregoing description, the invention has been with reference to certain particular preferred embodiments including dimensions, though it is to be understood that the specific details shown are merely illustrative and that the invention may be carried out in other ways without departing from the true spirit and scope of the appended claims.

I claim:
1. A saw chain cutter link comprising;
a body plate; and
an integral cutter tooth extending upwardly from the top edge of said body plate;
said cutter tooth having a shank portion laterally offset from and outwardly inclined to said body plate;
a flattened toe portion extending transversely inwardly of said body plate at substantially a right angle thereto; and
a small radius curved portion joining said shank and toe portions having an outside radius of curvature less than the sum of the inside radius of curvature plus the thickness of the body plate but no less than the thickness of said body plate;
said curved portion having a greater thickness than said shank and toe portions;
the forward edge of said toe, shank, and curved portions forming a continuous beveled surface;
said beveled surface being sharpened to form a continuous chisel cutting edge at its leading edge;
the beveled surface of said toe portion being concave in the direction of cutting; and
the beveled surface of said shank and curved portions being flat in the direction of cutting and providing a hooked cutting edge;
said cutting edge conforming to a cylindrical surface so that it can be sharpened with a cylindrical sharpening tool of uniform round cross-section having a longitudinal axis substantially coincident with the toe bevel axis of concavity.

2. A saw chain cutter link comprising:
a body plate, and
an integral cutter tooth extending upwardly from the top of said body plate,
said cutter tooth having a shank portion inclined outwardly and upwardly from said body plate,
and a flattened toe portion extending transversely inwardly of said body plate at substantially a right angle thereto,
said shank and toe portions intersecting in a small radius curved portion having a greater thickness than said shank and toe portions,
the outside radius of curvature in said curved portion being about two-thirds the sum of the inside radius of curvature plus the thickness of said shank portion.

3. A saw chain cutter link comprising:
a body plate,
a generally hook-shaped cutter tooth formed integrally with said body plate,
said cutter tooth including a shank portion extending upwardly from said body plate and being offset outwardly of said body plate,
said cutter tooth including a flat toe portion extending transversely inwardly of said body plate from the upward extremity of said shank portion at no less than a right angle with respect to the median plane of said body plate,
an upset curved portion joining said toe and shank portions,
the maximum transverse thickness of said upset curved portion being greater than the transverse thickness of at least the immediately adjacent portions of said toe and shank portions,
the outside radius of curvature of said upset curved portion being less than the sum of the inside radius of curvature of said curved portion and the thickness of said adjacent shank portion but greater than the thickness of said adjacent shank portion.

References Cited in the file of this patent

UNITED STATES PATENTS

| | | |
|---|---|---|
| 2,622,636 | Cox | Dec. 23, 1952 |
| 2,730,143 | Ryde | Jan. 10, 1956 |
| 2,792,035 | Aumann | May 14, 1957 |
| 2,913,023 | Hazzard | Nov. 17, 1959 |